United States Patent [19]
Clopton

[11] Patent Number: 5,211,276
[45] Date of Patent: May 18, 1993

[54] STOP FOR CONVEYOR

[75] Inventor: Robert T. Clopton, Magnolia, Ky.

[73] Assignee: Tekno Inc., Cave City, Ky.

[21] Appl. No.: 902,871

[22] Filed: Jun. 23, 1992

[51] Int. Cl.⁵ ............................................. B65G 47/00
[52] U.S. Cl. .............................. 198/345.3; 198/463.4; 193/35 A
[58] Field of Search ............... 198/345.3, 345.1, 463.4, 198/463.5; 193/35 A, 32, 40

[56] References Cited

U.S. PATENT DOCUMENTS

| | | | |
|---|---|---|---|
| 2,668,714 | 2/1954 | Huck | 193/40 |
| 3,618,741 | 11/1971 | Berndt | 198/463.5 |
| 4,487,309 | 12/1984 | Dorner | 198/463.4 |
| 4,489,824 | 12/1984 | Scourtes | 193/40 |

OTHER PUBLICATIONS

Transporters Series AW82 Accu-Wheelveyor Brochure.

Primary Examiner—Joseph E. Valenza
Attorney, Agent, or Firm—Theresa Fritz Camoriano

[57] ABSTRACT

A stop for stopping articles moving along a conveyor includes a stop arm mounted for rotation about a cam shaft, which, when rotated, moves said stop arm from an extended position to a retracted position.

14 Claims, 4 Drawing Sheets

STOP FOR CONVEYOR

BACKGROUND OF THE INVENTION

The present invention relates to conveyors, and, in particular, to a stop that is used to stop articles that are moving along the conveyor.

Stops have been used on conveyors for some time, particularly in assembly operations, where the product is assembled at various stops along the conveyor line. Some stops use a cylinder to gradually decelerate the article and cushion the stopping action, so that the articles being conveyed are not jolted when they are stopped. However, when the article is released, the stop is usually slid straight down, and the pallet or other article tends to jump as it is released by this mechanism, so that the jarring of the articles takes place upon release. The pallet also tends to wear at the corner, because of this jumping action. Also, the stop is constantly under load as it is holding the article against the force of the conveyor, and sliding the stop with that constant force on it creates substantial friction. It is also very difficult to seal the linear bearing surface, which means that dirt gets into the bearing surface, causing wear and other problems.

SUMMARY OF THE INVENTION

The present invention provides a stop for a conveyor which prevents the articles from being jarred both when stopping and starting.

The present invention also eliminates the problems of the linear bearing surface by providing a rotary bearing surface instead. This rotary bearing surface sees less friction, can easily be sealed to keep out dirt, and therefore has far fewer problems than the prior art linear bearing surfaces.

The present invention also eliminates the problems of corner wear on the pallets by eliminating the problem of the pallet tending to jump over the stop as it is being released.

DESCRIPTION OF THE PREFERRED EMBODIMENT

Figure 1:
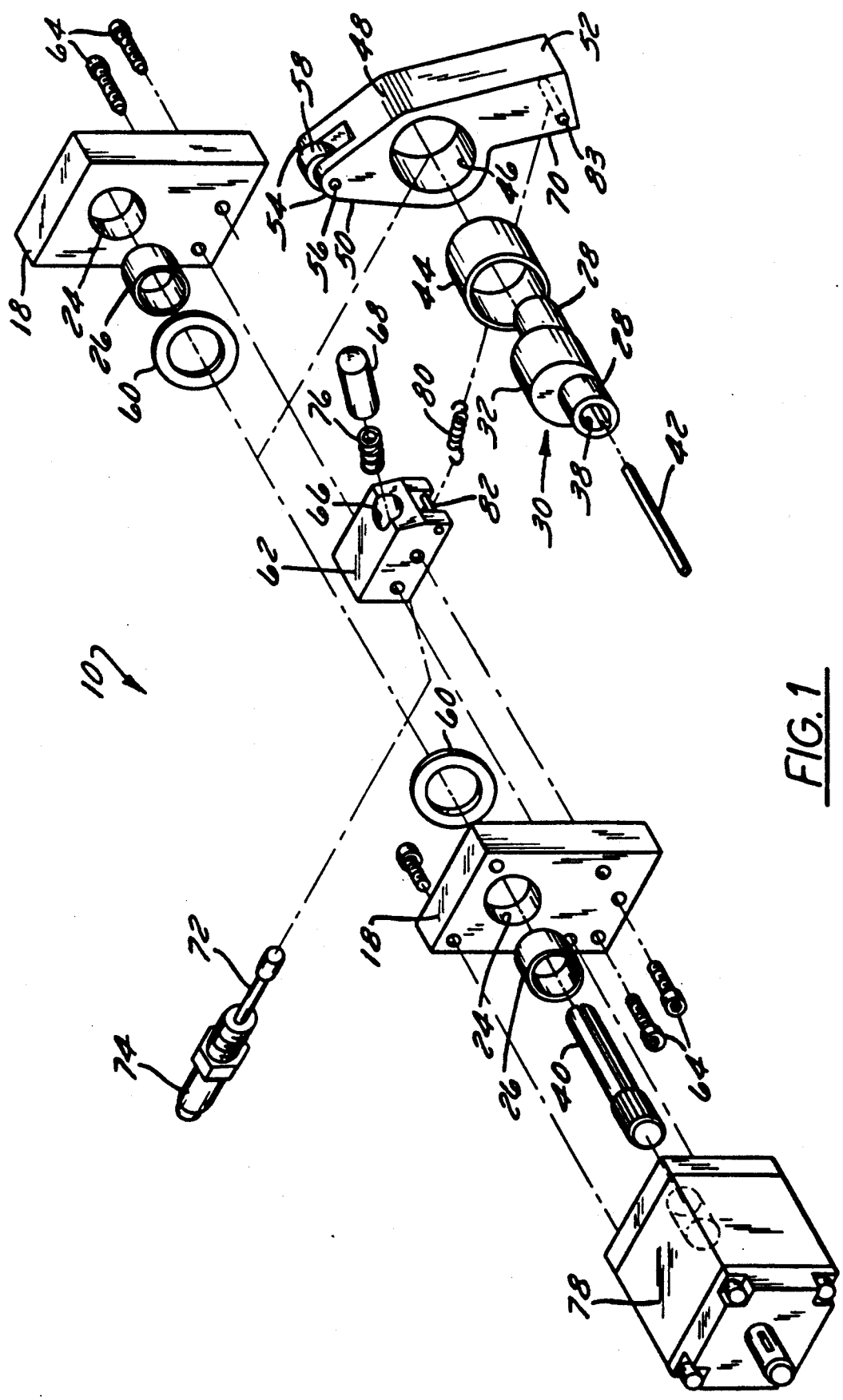
FIG. 1 is an exploded perspective view of a stop made in accordance with the present invention.

In the example of the present invention shown in FIGS. 1-6, the conveyor stop 10 is located between two strands of roller chain 12 (one strand shown). Pallets 14 ride on the two strands of roller chain 12. The pallets 14 have a central projection 16, which extends down between the two strands of roller chain. The central projection 16 may be at the front of the pallet 14, or it may be recessed back from the front of the pallet 14. This central projection 16 provides the surface against which the stop 10 acts in order to stop the pallet 14.

The stop 10 is mounted on a two-piece bracket 18, which is mounted on the conveyor frame 20 by means of bolts 22. Each of the bracket pieces 18 has a bore 24, which receives a rotary bearing 26, which, in turn, receives one end projection 28 of a cam shaft 30. The cam 30 has a cylindrical center portion 32 and two end projections 28, which extend from the two ends of the cylindrical center portion 32. The end projections 28 are also cylindrical, and the two end projections 28 are coaxial with each other, but the axis 34 of the end projections 28 is offset from the axis 36 of the cylindrical center portion 32. At least one of the end projections 28 has a keyed bore 38 which receives a shaft 40 and a key 42, which fixes the cam 30 and the shaft 40 together.

The cylindrical center portion 32 of the cam 30 is mounted in a bearing 44, which, in turn, is mounted in the cylindrical bore 46 of a stop arm 48. Thus, the stop arm 48 rotates about the axis 36 of the cylindrical center portion 32 of the cam 30, and the position of the axis 36 of the center portion 32 of the cam 30 changes relative to the conveyor frame 20, depending upon the angle of rotation of the cam 30 about the axis 34. Thrust bearing washers 60 are mounted over the ends 28 of the cam 30 and between the bracket 18 and the center portion 32 of the cam 30 to prevent the stop arm 48 from wobbling as it rotates about the bearing 44.

The stop arm 48 includes an upper arm portion 50 and a lower arm portion 52, which is longer and heavier than the upper arm portion 50, so that, if no other force is applied to the stop arm, the arm tends to rotate to a substantially vertical position, with the upper arm portion 50 pointing up and the lower arm portion 52 pointing down. The uppermost end of the upper arm portion 50 is in the shape of a yoke 54, in which is mounted a stationary pin 56. A stop roller 58 is mounted on the pin 56 and can rotate freely about the pin 56.

Figure 2:
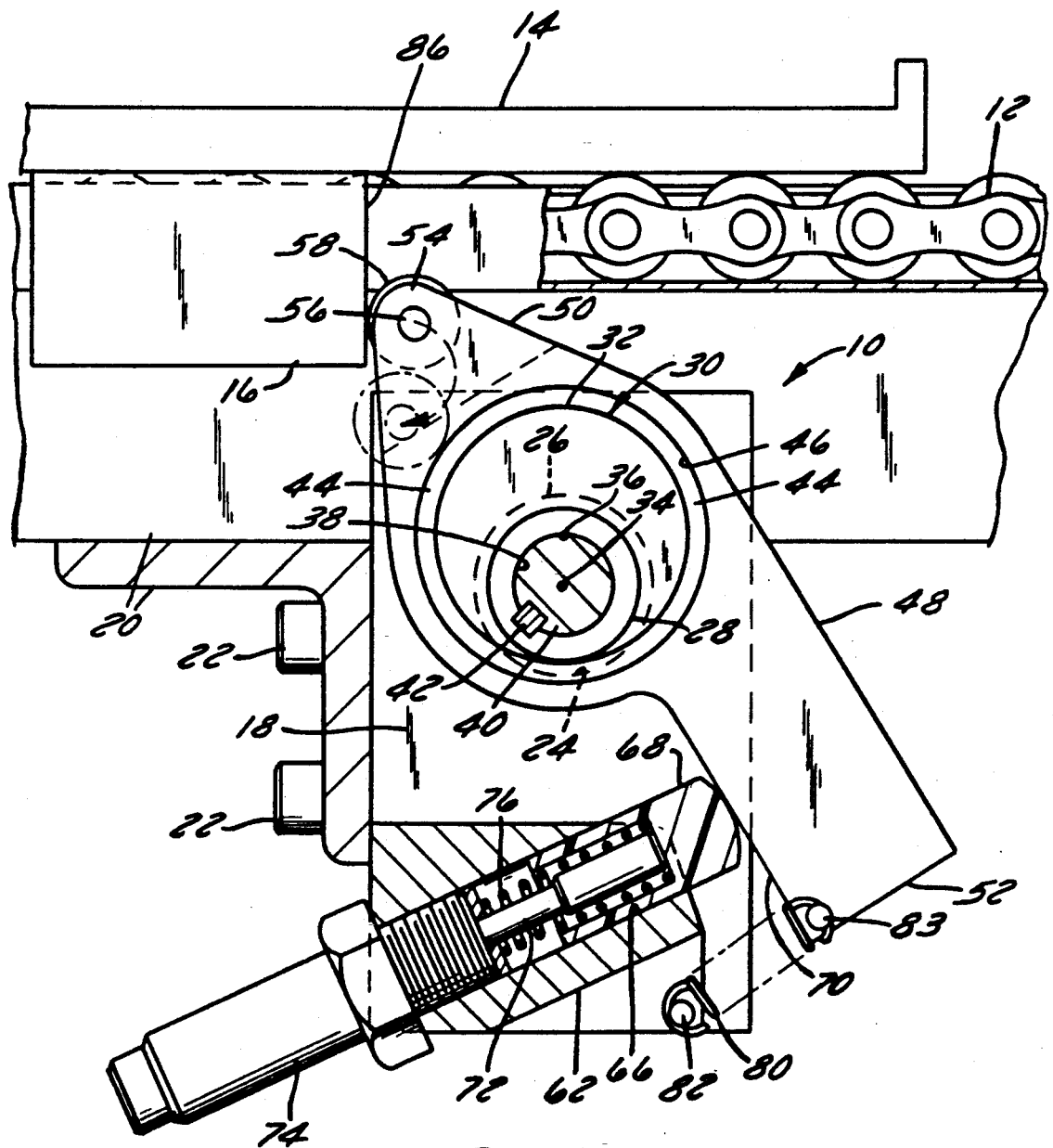
FIG. 2 is a broken-away side sectional view of a conveyor including the stop of FIG. 1.

A block 62 is mounted between the two bracket pieces 18 by means of bolts 64. The block 62 has a bore 66 which lies at an angle of approximately 25 degrees from the horizontal, so that the hydraulically-dampened pin 68 extends in the proper direction to directly oppose the motion of the stop arm 48 as it rotates in a clockwise direction about the bearing 44. The hydraulically-dampened pin 68 is mounted on a piston 72, which travels in a threaded cylinder 74 that is threaded into the bore 66 in the block 62. The pin 68 is extended by means of the spring 76 so that it is in contact with the edge 70 of the stop arm 48 when the stop arm 48 is in the stop position, as shown in FIG. 2.

Then, when the projection 16 from the pallet 14 contacts the stop roller 58, it causes the stop arm 48 to pivot about the bearing 44, and the hydraulically-dampened pin 68 absorbs the energy which must be dissipated in order to stop the pallet without jolting the pallet 14 or the articles carried on the pallet 14 (not shown). The piston 72 and cylinder 74 which provide the damping are shown in FIG. 2. The pin 68 is mounted on the piston 72 and can move downward and to the left, as the piston 72 moves into the cylinder 74, until the pin 68 contacts the end of the cylinder 74. The position of the cylinder 74 may be adjusted by threading it into or out of the bore 66, which permits close control of the position at which the pallet 14 is stopped.

In this embodiment, the shaft 40, which rotates the cam 30, is mounted in a rotary actuator 78, which rotates the cam 30 from the stop position shown in FIG. 2, with the axis 34 of the ends 28 directly below the axis 36 of the center portion 32, to the retract position shown in FIG. 6, with the axis 34 of the ends 28 directly above the axis 36 of the center portion 32 of the cam, and back again, covering a 180-degree range of motion. Of course, other means could be used besides a rotary actuator to cause the shaft to rotate, but this is the preferred means.

The block 62 also has a yoke portion, with a pin 82 mounted in it, and a spring 80 is connected at one end to the pin 82 and at the other end to a hole 83 at the lower end of the stop arm 48, which urges the stop arm 48 toward a vertical position.

Figure 3:
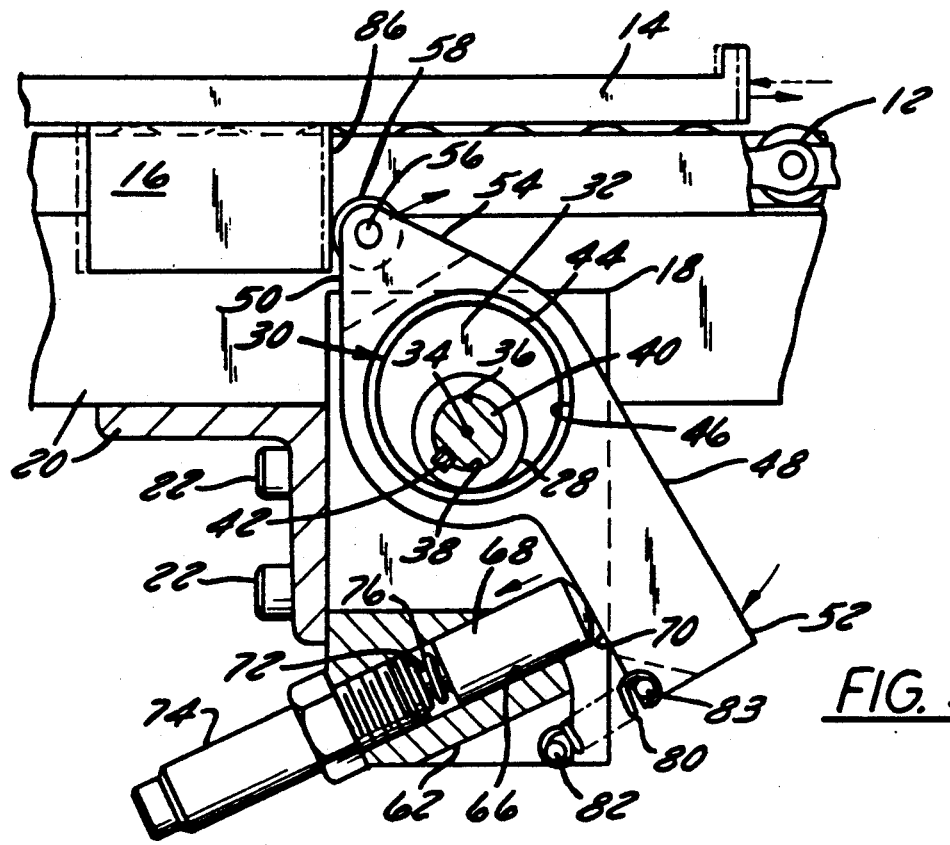
FIG. 3 is similar to FIG. 2, except it shows how the stop pivots to cushion the article as it stops.
Figure 4:
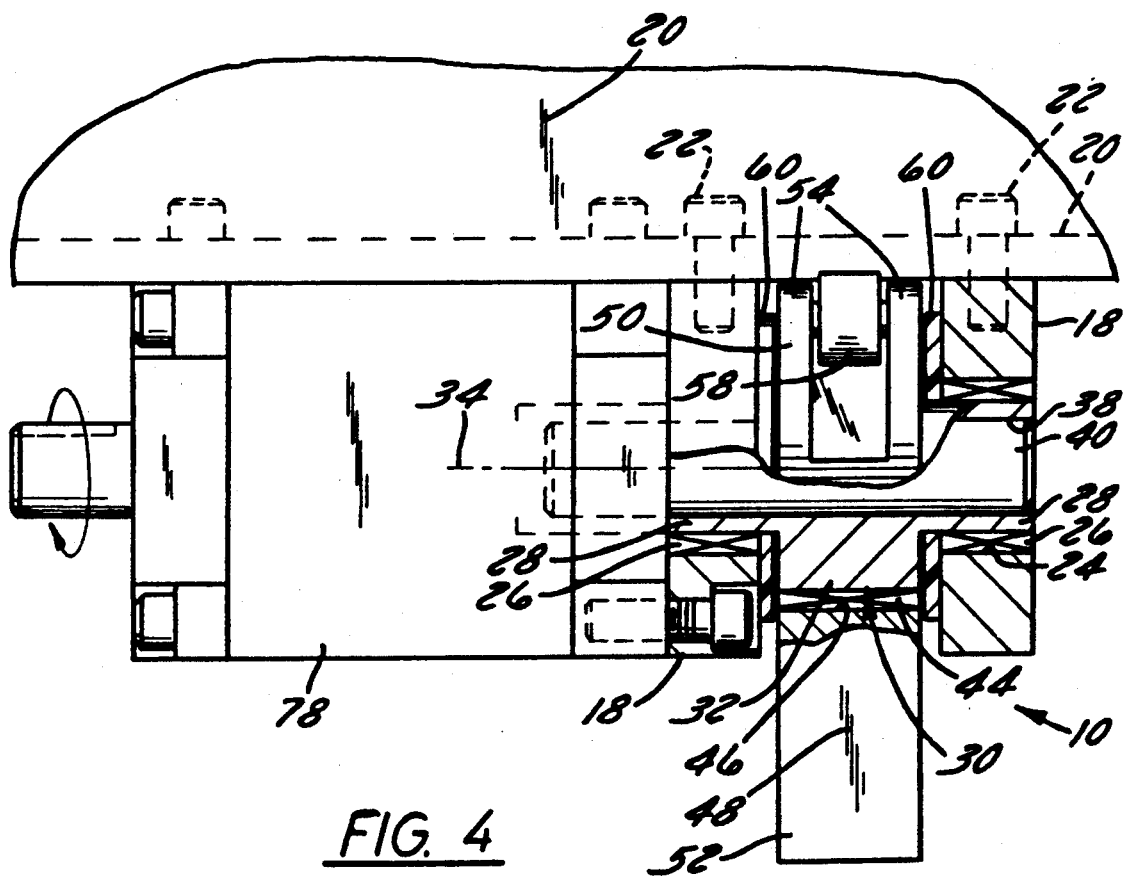
FIG. 4 is a broken-away plan view, partially in section, of the stop of FIG. 1 mounted on the conveyor.

Operation of the stop 10 is as follows:

When the stop 10 is extended and ready to stop pallets, it is in the position shown in FIGS. 2 and 3. The axis 34 of the projections 28 on the ends of the cam 30 is in a position directly below the axis 36 of the cylindrical center portion 32 of the cam 30. This causes the axis 36 of the bearing 44 to be at its highest point relative to the conveyor frame 20, putting the stop roller 58 up in position to contact the pallet projection 16. The pallet 14 is moving to the right, carried by the roller chains 12. When the projection 16 from the pallet 14 contacts the stop roller 58, the stop arm 48 pivots clockwise, with the hydraulically-dampened pin 68 dampening the motion, so that the articles carried on the pallet 14 are not jarred as the pallet 14 is stopped.

The pallet then sits in place, with the chains 12 continuing to run under the pallet, trying to cause the pallet 14 to move toward the right. The force from the chains 12 is counteracted by the pin 68 acting against the stop arm 48. Some work is probably done to the article on the pallet at this point. In an assembly operation, for example, a part may be added to the article (not shown) riding on the pallet 14.

Figure 5:
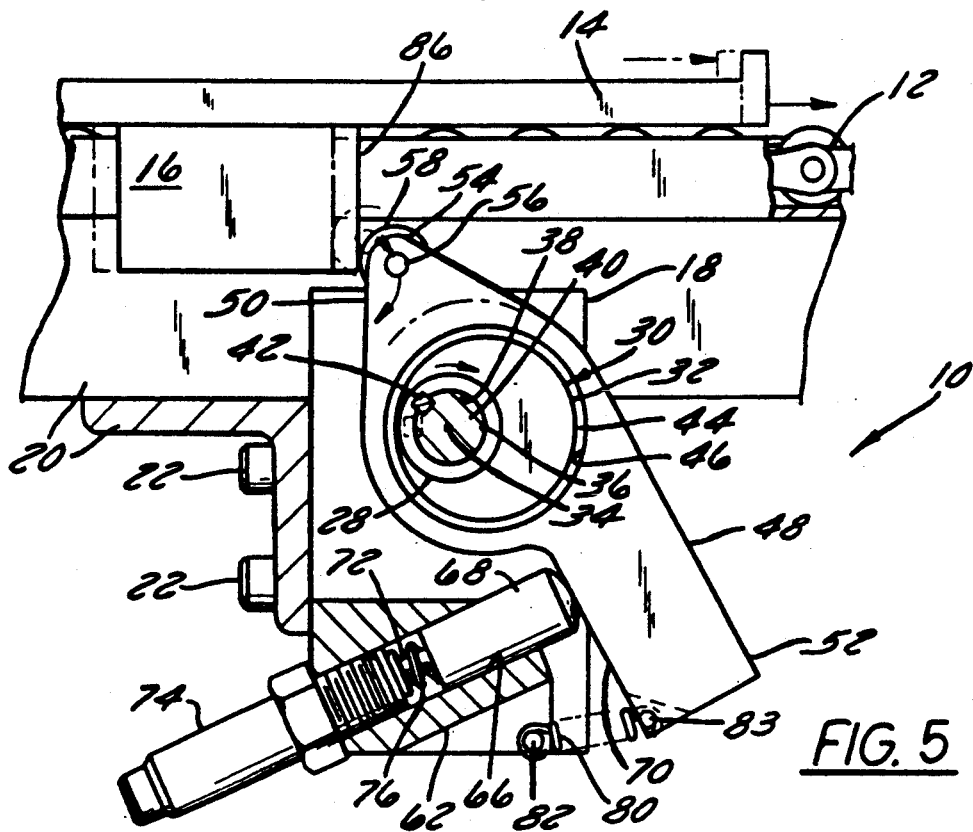
FIG. 5 is the same view as FIG. 3, except that the cam has been rotated 90 degrees.
Figure 6:
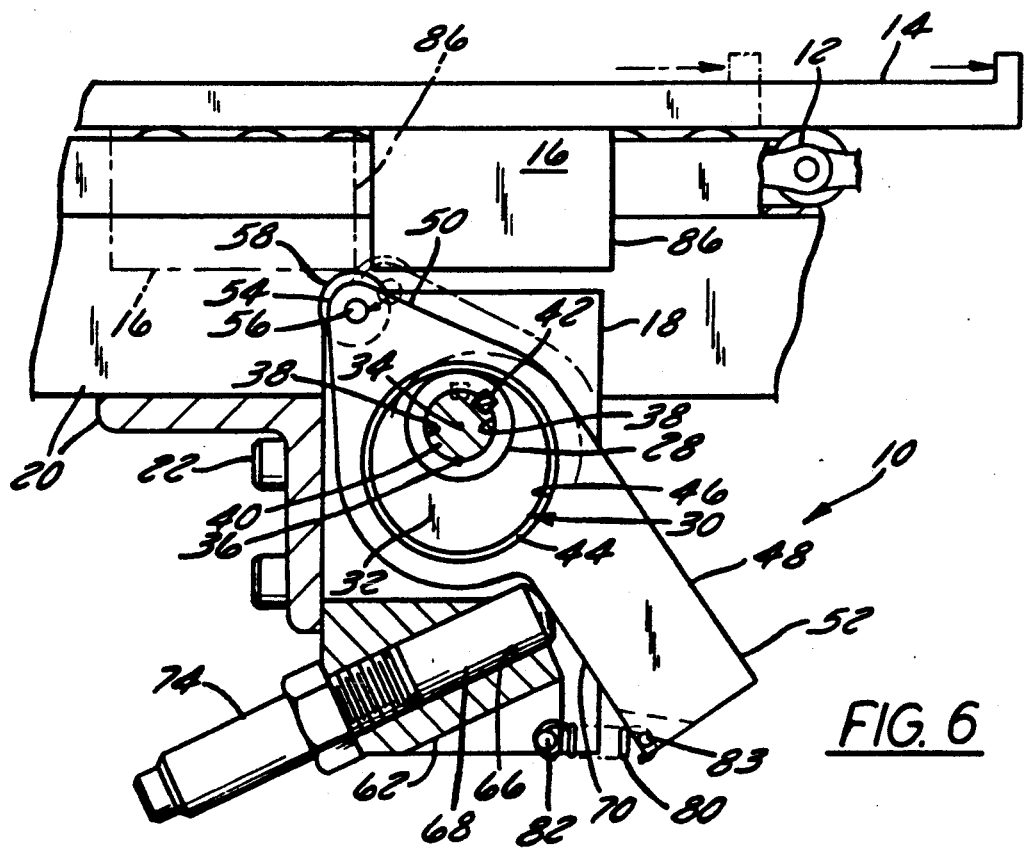
FIG. 6 is the same view as FIG. 3, except the cam has been rotated 180 degrees to release the pallet.

In order to release the pallet 14 so it can continue moving along the conveyor, the rotary actuator 78 is activated, causing the keyed shaft 40 to rotate clockwise, from the position in FIGS. 2 and 3 through the position in FIG. 5, and then to the position in FIG. 6. This motion causes the stop roller to move in an arc to the right and downward, as the axis 36 of the bearing 44 is pivoted in an arc to the right and downward.

This release motion permits the pallet 14 to begin moving gradually to the right, as the stop roller 58 moves to the right, so as to provide a gradual acceleration of the pallet 14, avoiding a jerky start. The rotary actuator moves faster than the pallet 14 accelerates so that, by the time the stop roller 58 drops below the bottom of the projection 16, the stop roller 58 has already moved ahead of and out of contact with the projection 16. This eliminates the jolting and edge wear that are found in prior art stops, where the pallet jumps over the end of the stop as the stop slides straight down.

As soon as the front edge 86 of the pallet projection 16 has moved over the stop roller 58, the actuator 78 is returned to its starting position. The stop roller 58 will then stay down, rolling along the bottom of the projection 16, until the projection 16 passes, allowing the stop arm 48 to rotate clockwise about the bearing 44, putting the stop roller 58 back in the extended or "stop" position. This feature is important, because it allows the stop 10 to mechanically seek the next opening on its own, eliminating the need for special electronic or hydraulic controls to tell it when the pallet has passed.

When the next pallet 14 arrives, it contacts the stop roller 58, causing the stop arm 48 to rotate clockwise, with the energy being dissipated by the hydraulically-dampened pin 68, so that the pallet stops. Then, the actuator 78 rotates the cam 30 180 degrees, to the position shown in phantom in FIG. 2 and shown in solid lines in FIG. 6, so that the stop roller 58 moves in an arc forward and down, permitting the pallet 14 to accelerate gently, without jarring the articles on the pallet and without jumping over the stop.

The embodiment described above is the preferred embodiment of the present invention, but it will be obvious to those skilled in the art that modifications may be made to this embodiment without departing from the scope of the present invention.

What is claimed is:

1. A stop for stopping articles that are travelling along a conveyor, comprising:
    a stop arm, defining a bore and including an upper arm portion above the bore and a lower arm portion below the bore;
    a shaft, including an end portion and a cylindrical portion eccentric from said end portion and mounted in said bore, such that said stop arm rotates about said cylindrical portion; such that said stop may be moved from an extended position, along an arcuate path, to a retracted position by rotating said shaft.

2. A stop for stopping articles that are travelling along a conveyor, comprising:
    a stop arm, defining a bore and including an upper arm portion above the bore and a lower arm portion below the bore;
    a shaft, including a cylindrical portion mounted in said bore, such that said stop arm rotates about said cylindrical portion;
    wherein said shaft includes end portions which lie along a single axis which is parallel to and offset from the axis of said cylindrical portion, such that the rotation of said shaft causes said stop arm to move along an arc from an extended position to a retracted position.

3. A stop for stopping articles as recited in claim 2, and further comprising a rotary actuator attached to said shaft for rotating said shaft.

4. A stop for stopping articles moving along a conveyor, comprising:
    a bracket for mounting the stop to the conveyor frame;
    a cam shaft, including coaxial ends and a central cylindrical portion which has an axis that is parallel to and offset from the axis of said ends;
    said bracket defining a bore which receives the ends of said cam shaft; and
    a stop arm mounted for rotation about said central cylindrical portion of said cam shaft, said stop arm including an upper portion and a lower portion.

5. A stop as recited in claim 4, and further comprising a yoke portion at the upper end of said upper arm portion; a pin mounted across said yoke portion, and a stop roller mounted on said pin.

6. A stop as recited in claim 4, and further comprising a dampening pin mounted on said bracket so as to gradually decelerate and stop the lower arm portion as said lower arm portion rotates toward said dampening pin.

7. A stop as recited in claim 4, wherein said stop arm is unbalanced about said central cylindrical portion, causing the stop arm to tend toward a vertical position, with the upper portion up and the lower portion down.

8. A stop as recited in claim 4, and further comprising a rotary actuator connected to said cam shaft.

9. A stop as recited in claim 4, wherein, when said cam shaft is in a first position, said stop is elevated, and, when said cam shaft is in a second position, said stop is retracted, and wherein said stop follows a curved path in moving from said elevated position to said retracted position.

10. A stop as recited in claim 4, and further comprising a spring, with one end of said spring attached to said stop arm and the other end of said spring fixed relative to said bracket, such that said spring urges said stop arm toward a vertical position, with the upper arm portion up and the lower arm portion down.

11. A conveyor, comprising:
a frame;
conveying means mounted on said frame for moving articles along the conveyor;
a stop, including a bracket mounted on said conveyor frame, said bracket defining a bore; a cam shaft having ends mounted in said bore of said bracket so that said cam shaft can rotate relative to said bracket; said cam shaft including a central portion with an axis offset from the axis of said ends; and a stop arm mounted on said central portion of said cam shaft so as to rotate about said central portion.

12. A conveyor as recited in claim 11, wherein said conveying means defines a direction of travel, and wherein the axis of said cam shaft is substantially perpendicular to the direction of travel.

13. A conveyor as recited in claim 12, and further comprising a dampening pin mounted to said bracket for decelerating and stopping the rotation of said stop arm about said central portion of said cam shaft.

14. A conveyor as recited in claim 11, and further comprising a rotary actuator mounted on one end of said cam shaft and fixed relative to the conveyor frame.

* * * * *